United States Patent [19]

Chivian et al.

[11] 3,789,421

[45] Jan. 29, 1974

[54] BINARY LOGIC APPARATUS

[76] Inventors: Jay S. Chivian, 919 Warfield Way, Richardson, Tex. 75080; Richard N. Claytor, 3306 Woodford Dr., Arlington, Tex. 76010; Dayton D. Eden, 6827 Meadow Creek, Dallas, Tex. 75240

[22] Filed: Feb. 2, 1971

[21] Appl. No.: 112,013

Related U.S. Application Data

[63] Continuation-in-part of Ser. No. 825,677, May 19, 1969, abandoned.

[52] U.S. Cl. ............ 346/1, 340/173 LM, 346/76 L, 346/135, 350/160 P

[51] Int. Cl. .......................................... G01d 15/34

[58] Field of Search...... 346/76 L, 76 R, 1, 21, 135; 340/324 R, 173 CC, 173 CH, 173 LT, 173LS, 173 LM; 350/160 P, 160 R; 40/28 C, 130R

[56] References Cited

UNITED STATES PATENTS

| | | | |
|---|---|---|---|
| 3,655,256 | 4/1972 | Claytor et al. | 346/76 X |
| 3,314,073 | 4/1967 | Becker | 346/76 L |
| 3,438,022 | 4/1969 | Teeg et al. | 340/324 R |
| 3,496,662 | 2/1970 | Choate | 40/28 C |

*Primary Examiner*—Joseph W. Hartary
*Attorney, Agent, or Firm*—Charles W. McHugh

[57] ABSTRACT

Disclosed are apparatus for recording information in binary form on thermochromic recording media, apparatus for optically and electronically interrogating such recording media, and systems utilizing thermochromic materials for processing data in binary form.

8 Claims, 6 Drawing Figures

JAY S. CHIVIAN
RICHARD N. CLAYTOR
DAYTON D. EDEN
INVENTORS

BY [signature]
ATTORNEY

JAY S. CHIVIAN
RICHARD N. CLAYTOR
DAYTON D. EDEN
INVENTORS
BY Charles W. McHugh
ATTORNEY

BINARY LOGIC APPARATUS

This is a continuation-in-part of application Ser. No. 825,677, filed May 19, 1969, now abandoned.

This invention relates to information recording apparatus and more particularly to apparatus and methods for storing large volumes of information in binary form. More particularly, it relates to a logic system using a thermochromic material as the recording medium in which extremely high densities of binary information may be stored and processed.

Conventionally, large volumes of data are recorded and stored by first reducing the data to binary form and recording binary information bits in a bistable recording medium such as a magnetic tape or magnetic disc. When large amounts of information are stored in binary form on magnetic tape, it becomes somewhat difficult to locate specific information bits on the tape since long strips of tape must sometimes be moved past the recording or play-back head to locate the precise information bit desired. Likewise, when binary information is recorded on a magnetic disc, a large and somewhat cumbersome recording and/or play-back head must be moved over the disc to provide random access to any specific information recorded on the disc. Furthermore, the amount of binary information which may be recorded is limited by the number of resolvable units which may be recorded per unit area of recording medium. Thus, unless the resolution of the recording medium and the recording and play-back apparatus is exceptionally high, large amounts of recording medium will be required to record data in binary form.

Briefly, according to the present invention, an apparatus and method for recording information in binary form is provided in which binary data is recorded in a thermochromic material which exhibits hysteresis in changing from a first reflectance to a second reflectance as a result of a change in temperature over a certain range. A characteristic (e.g., reflectance) of selected portions of a recording film is varied in response to binary signals impressed upon the film, each portion of the film corresponding to a binary information bit. Read-out is accomplished by determining the reflectance or electrical conductivity of any particular discrete portion of the film. Furthermore, the state of each spot can be inverted as desired from a first state to a second state and from a second state to a first state, thus providing a complete logic function as well as data storage.

It is therefore an object of the invention to provide methods and apparatus for thermally recording information in binary form. Another object is to provide an optical recording medium upon which information may be recorded in binary form in extremely high densities and which will operate as a logic device. A further object is to provide apparatus and methods for recording binary optical data in a bistable recording medium and interrogating the recording medium electronically. Other objects, features and advantages of the invention will become more readily understood from the following detailed description taken in connection with the appended claims and attached drawing in which:

Figure 1:
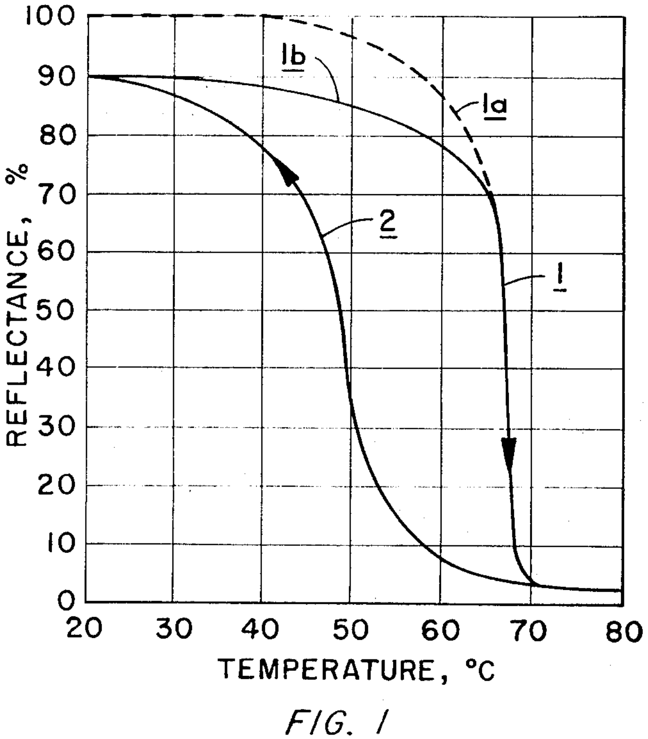
FIG. 1 is a plot of reflectance of red light versus temperature for cuprous mercuric iodide.

The term "thermochromic material" as used herein refers to those materials which exhibit hysteresis in changing from a first reflectance to a second reflectance (in a portion of the visible spectrum) with change in temperature over a certain range.

For example, compounds having a general formula $M_2M'X_4$, where M may be $Ag^{1+}$, $Cu^{1+}$ or $Tl^{1+}$, and M' may be $Hg^{2+}$ or $Cd^{2+}$, and X is a halide, are known to exhibit thermochromism. Besides the ternary halides, other compounds exhibit thermochromism, including certain transition metal oxides (e.g., the vanadium oxides) and several ternary chalcogenides having the formula $MM'_2X_4$ where M is zinc, cadmium or mercury, M' is aluminum, gallium or indium, and X is sulphur, selenium or tellurium.

In accordance with this invention, the above-described materials can be used in the form of a film or paint formed by suspending a finely divided powder of such materials in a suitable binder. The binder, however, is used merely as a convenient means to support a uniform layer of the thermochromic material. Other means for providing a substantially uniform layer of thermochromic material are also within the intended scope of the invention. For convenience, the term "thermochromic film" is generally used herein to designate a layer, film or paint consisting essentially of materials of the class described which are suspended in any suitable medium or which are produced by any acceptable means. Furthermore, since it is believed that the mechanisms by which such materials exhibit thermochromism are closely related in all such materials, cuprous mercuric iodide ($Cu_2HgI_4$) will be discussed hereinafter as exemplary of the entire class of compounds. It should be understodd, however, that $Cu_2HgI_4$ is used herein as a typical example of thermochromic materials merely by way of illustration and not by limitation. Other materials of the class defined, under proper conditions, exhibit the phenomena described herein and may be substituted for $Cu_2HgI_4$ in appropriate application of the principles of this invention. Since the principles of the invention rely in part on certain phenomena exhibited by thermochromic material, these phenomena will be discussed in detail.

Paints or films of cuprous mercuric iodide change from bright red at about room temperature to dark brown or black at about 66°C and return to their original red appearance on being cooled to about 35°C. The change from red to black and black to red is not an isothermal change. Instead, when the material is heated from a temperature of about 40°C to a temperature of about 70°C, the material changes from red to black passing through intermediate shades of brown at intermediate temperatures. However, upon cooling the same material, essentially no change in color is observed until the material is reduced to about 62°C, and complete transition of black to red is not effected until the material is lowered to about 30°C. This phenomenon is analagous to the hysteresis observed in magnetic materials, and is conveniently referred to as a "hysteresis effect." Hysteresis may alternatively be described as the existence of a plurality of reflectances for a given temperature within a certain temperature range.

Although the hysteresis effect as described above has been previously observed, it has sometimes been attributed to impurities in the material rather than a real hysteresis effect. It has been discovered, however, that the hysteresis effect is real, consistent, and reproducible, and that thermochromic materials exhibit other phenomena which may be utilized in conjunction with the reflectance changes in performing many unique functions. For example, it has been discovered that extremely high resolution recording of information can be obtained in thermochromic materials by varying the temperature of discrete portions of a thermochromic film within a certain temperature range. Furthermore, thermally generated images recorded in thermochromic materials in accordance with this invention may be indefinitely stored, reproduced as desired, or erased as desired.

The hysteresis effect observed in cuprous mercuric iodide is graphically illustrated in FIG. 1, wherein the ordinate represents percent reflectance of red light (6,328 A) and the abscissa represents temperature. Line 1 represents the plot of reflectance versus temperature as the material is heated from room temperature to approximately 80°C. It will be observed that cuprous mercuric iodide is red at room temperature and retains its full brightness until it reaches approximately 45°C. Thereafter, increasing the temperature causes the material gradually to lose some of its reflectance. After reaching about 66°C the reflectance decreases rapidly until the material appears so dark that it may be properly described as black near 70°C; a further increase in temperature has little appreciable effect on the color of the material. Above about 70°C, the material may be described as being in its saturated black state, and additional heating produces no approciable change in reflectance until temperatures are reached which cause chemical change, such as oxidation.

When the same material is cooled from its saturated black condition, a plot of reflectance versus temperature does not follow the same path it followed when the temperature was being increased. Instead, the material demonstrates what is conveniently described as a classical hysteresis effect. Reflectance increases with decreasing temperature along a path indicated by line 2 which is displaced some 16° or 17° below (to the left of) the temperature-increasing path indicated by line 1. The rate of increase in reflectance decreases when the material cools to about 45°C, and the material does not reach its maximum reflectance (i.e., it is not red saturated) until it reaches about 30°C. As with the temperature increase above the black saturated condition, a temperature decrease below 30°C has little effect. Once the material is red saturated, a further decrease in temperature produces essentially no further change in reflectance.

It should be noted that in some thermochromic materials, the hysteresis curve may not be truly symmetrical (in the classical sense), particularly if the temperature cycle time is short. For example, it has been experimentally observed that cuprous mercuric iodide may not immediately recover its full red reflectance when rapidly cooled from a high temperature. Thus, when the material is rapidly cooled to about room temperature, because of this delayed recovery the material may not immediately reach the original 100 percent red saturation condition. In the initial cold state the hysteresis curve proceeds along line 1*a* – 1 and, upon cooling, follows line 2. If the material is reheated shortly after the above-described cooling, the increasing temperature versus reflectance plot will follow line 1*b* – 1. However, with sufficient time lapse between cooling and reheating, the low temperature reflectance will approach the 100 percent red saturation condition. Delayed recovery is of little consequence to the invention, however, since it occurs near the low temperature end of the hysteresis loop, while in those cases pertinent to the invention the material is used at temperatures near the red-to-black transition temperature. Said red-to-black transition temperature is defined as the point on a temperature-increasing curve at which the curve has an inflection point. For simplicity, the hysteresis curves referred to hereinafter will ignore the delayed recovery and will be referred to as if they were always like the curve shown in lines 1*b* – 1 and 2, i.e., as if they were essentially as symmetrical as classical hysteresis curves.

Since the temperature at which thermochromic materials can be accurately said to be 100 percent saturated is difficult to ascertain (because it approaches a true 100 percent saturation condition asymptotically), it is more practical to assign the term "saturated" to any reflectance condition which is within about 5 percent of a pure saturated condition (disregarding the aforementioned delayed recovery effect). Thus, cuprous mercuric iodide in its cold state (after being cycled through the hysteresis loop) can be said to be red saturated at any reflectance measured within 5 percent of the top of the loop, while the material in its heated condition may be said to be black saturated when its reflectance is within 5 percent of the height of the loop above the pure black saturated reflectance.

While necessity dictates that a reflectance of 5 percent or less, for example, be accepted as equivalent to no reflectance, prudence dictates that the definition of "saturation" should not be treated too loosely. Hence, it is not intended herein to use the term "saturation" so as to encompass, for example, reflectances well between the knees of the hysteresis envelope.

The two paths traced on FIG. 1 indicating reflectance of the material in transition between its two extreme reflectances form a loop which constitutes the envelope that will enclose all of the paths followed by the material regardless of its temperature history. The hysteresis loop, then, may be said to be bounded on its high end by the minimum temperature at which the material is black saturated, and bounded on its low end by the maximum temperature at which the material is red saturated. The fact that the ends of the loop may not always be precisely locatable with a particular material is of little consequence, since the operating region of the invention is usually in the vicinity of the center of the transition temperature range.

Figure 2:
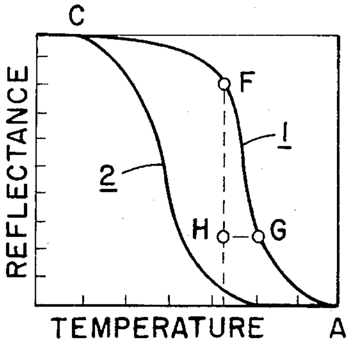
FIG. 2 is a schematic plot of reflectance versus temperature similar to FIG. 1.

Characteristic behavior of thermochromic materials within the hysteresis loop is illustrated in FIG. 2. As explained above, a thermochromic material will exhibit a change in reflectance upon being heated which is indicated by line 1. As the material is heated along line 1 from point C to point F, its reflectance begins to change. If, however, part of the material is held at a constant temperature equivalent to point F and the remainder heated further along line 1 to point G, the two portions of the material will exhibit different reflectances. Furthermore, if the hotter portion of the material is allowed to cool without first being heated to point A, the decreasing reflectance versus temperature plot will not follow line 1, but will be in the direction of point H. When the heated portion has cooled to the temperature of point H, the two portions of the material, although again in thermal equilibrium, will exhibit diverse reflectances as a result of their different thermal histories.

It should be noted that the plot of reflectance versus temperature for the material being cooled is shown for simplicity as a horizontal line from point G to point H. However, as with conventional hysteresis phenomena, the decreasing temperature plot of reflectance versus temperature will be in the general direction of line 2, but will approach line 2 asymptotically.

From the foregoing it will be observed that because of the hysteresis effect, optical images may be thermally generated in thermochromic materials by selectively varying the temperatures of portions of a thermochromic film. The image thus formed will be preserved in the film as long as the temperature of the film is maintained within the temperature range encompassed by the hysteresis loop. The image, however, can be erased by simply heating the film to its black saturation temperature, e.g., to a temperature above the hysteresis loop.

It has also been discovered that thermochromic materials exhibit another unique phenomenon which is not analogous to magnetic memory; that is, a thermochromic film upon which an image has been formed by the techniques described above will retain the information stored therein even though the temperature of the film is lowered below the hysteresis loop. For example, if an entire film of thermochromic material is heated from point C (referring still to FIG. 2) to point F, and part of the material is maintained at a temperture corresponding to point F while the remainder is heated to point G, the two portions will exhibit diverse reflectances as explained hereinabove. If the temperature of the entire film is then reduced below the temperature of point C (without being heated to a temperature above point A), the entire film will return to a condition at which the reflectances of all of its portions correspond to point C. To the unaided human eye, the appearance of all of the material will be the same. However, the thermal histories of the two portions are different; and, upon reheating the film again to a temperature at least as high as point F, the earlier obtained diverse reflectances will again be exhibited. Thus, the diverse thermal histories of the two portions have an effect on the thermochromic material which permits reestablishment of the image recorded thereon.

From the foregoing it will be observed that information recorded in the material through deliberately varied thermal conditions impressed on the material can be semi-permanently stored in the material by simply reducing the temperature thereof below the hystersis loop. The stored information can be reproduced within a reasonable time by raising the temperature of the recording medium back to at least the bias temperature, e.g., point F. Of further advantage, when the recording medium is stored at a temperature below the "low" saturation temperature, it is immune to further change by accidental or inadvertent exposure to energies which would produce significantly different thermal histories if the material were stored at temperatures within the hystersis loop. Thus, information recorded therein may be stored for short periods of time at temperatures below the loop and such information is not easily accidentally destroyed. Too, if a power failure should happen to interrupt the current flowing through a heater which is maintaining a bias temperature in the material, the information stored in the material is not lost. It should be noted, however, that if material is maintained at the holding or bias temperature at all times after the information is recorded therein, such information will be stored indefinitely. The only way that the thermal history (and thus the information) can be quickly erased is by heating the material to a saturation temperature above point A.

When a thermochromic film is maintained at any bias temperature within the hystersis loop (e.g., point F in FIG. 2), relatively little additional energy need be selectively added to raise discrete portions of the material to higher temperatures, thus writing information into the material. Temperature increases as slight as one-fourth degree centrigrade are sufficient to produce wide changes in reflectance when using the steep portion of line 1 which is about midway between the knees of the curve. Therefore, information can readily be recorded on the thermochromic material with any source of energy which will be absorbed by the thermochromic material.

In accordance with the invention, information is recorded in a thermochromic film by selectively heating discrete portions of the film with a radiant energy beam, such as an electron or laser beam. The portions of the thermochromic film exposed to the beam are selectively heated and the reflectance thereof changed so as to produce a record of points exposed to the energy beam.

When a source of radiation of known wavelength is used to supply the thermal energy, the thermochromic material should be selected so that it has a high value of absorptivity at the wavelength used. In the visible portion of the spectrum, cuprous material iodide is highly reflective in the red; but it has a very low reflectance in the 6 to 14 micron region. Thus, $Cu_2HgI_4$ is well suited for absorption of infrared energy and particularly well suited for absorption of the 10.6 micron radiation of the standard carbon dioxide laser. The advantages of cuprous mercuric iodide will be even more appreciated in view of the ready availability of $CO_2$ lasers of high quality.

It has been unexpectedly discovered that extremely high resolution can be obtained in thermally generated images. In fact, the spatial resolution exhibited by $Cu_2HgI_4$ exceeds that of most photochemical films and is inferior only to the best high resolution spectroscopic plates. Resolution quality in the one micron range is routinely observed in recording images by simply focusing the optical image on a suitably biased film of thermochromic material and insuring that the beam power is sufficient to permit rapid exposure. Quite surprisingly, heat from such optical images does not significantly diffuse within the material during exposure times of interest. Of course, untoward diffusion of the energy could be caused by application of greatly excessive amounts of energy through longer exposure times. Such application of excess energy would be comparable to over-exposure of ordinary light-recording media. Over-exposure can be avoided with the excersise of such ordinary care as one would observe in the use of equivalent high quality photographic emulsions with due attention to the reciprocity law formulated by Bunsen and Roscoe.

It will be recognized that the energy absorbed by the thermochromic film is proportional to the product of the power density of the beam and the exposure time. For exposure times of practical interest, this is equivalent to the reciprocity law ($E = Pt$) which is well known to those who work with photographic material. The reciprocity law of thermochromic materials differs from the reciprocity law of photographic materials, however, in that an upper limit exists on the exposure time, said upper limit being dependent on how much diffusion of heat through the film is tolerable. To keep diffusion low and thus achieve high resolution, the power density of the beam should be adequate to permit absorption of sufficient energy to cause a change in reflectance within a period of time that is not appreciably greater than (and preferably is shorter than) the ratio of the square of a given diffusion length and the material's thermal diffusivity.

A lower limit also exists on the power density of the exposing radiation, i.e., the material has a threshold below which no exposure will occur. This threshold has been experimentally found to be about 150 milliwatts/cm$^2$ for cuprous mercuric iodide in silicone varnish. Such a threshold is related to the above-mentioned upper limit on time, in that the threshold is a function of the thermal properties of the material. The threshold exists because the temperature of a spot at which heat is being applied will never rise to the extent that a change in reflectance is observed if the power of the beam is so low that heat can diffuse through the material at least as fast as heat is being applied. Fortunately, the power density threshold has always been found to be so low as never to constitute a limitation on use of the material. Furthermore, the minimum exposure time involved (even for resolutions of one micron) are sufficiently long that they can be easily obtained and do not lead to probitively large power densities.

The thermal diffusivity of a material is given by the equation: $= K/c_p\rho$ where $c_p$ = specific heat of film at constant pressure, cal/gm degC $\rho$ = density of film, gm/cm$^3$ $K$ = thermal conductivity of the film, cal/cm degC sec To treat the aforementioned diffusion length, let it be assumed that heat is applied to a finite spot on the surface of the material. The excess radius, $l$, of the resulting spot at a time, t, afte application of heat is given by $$l^2 = t$$

where is the thermal diffusivity. The excess radius, $l$, in this example is more generally referred to as the diffusion length. To achieve good resolution, $l$ must naturally be kept low; exactly how low seems necessary is, of course, dependent upon the wavelengths of the electromagnetic radiation being used in the recording process. Since the thermal diffusivity of a given material is fixed, control of diffusion length is achieved by keeping the time of application of heat short.

To illustrate how diffusion of heat is controlled, let it be assumed that a beam of radiant energy is focused to a diameter of one micron. When the beam impinges on the film, the directly heated spot is thus one micron in diameter. Let is next be assumed that it is desired to limit thermal diffusion of heat through the film with the result that after the beam has been removed the resulting spot is no larger than 2 microns. To determine how fast the heat must be applied, the thermal time constant,$\tau$, for this example must be calculated. The excess of spot diameter due to diffusion of heat is $2-1 = 1$. Thus, $l$ is one-half of this, or $\frac{1}{2} \times 10^{-4}$ cm. Assuming the film to be cuprous mercuric iodide suspended in a silicone varnish, a value for the specific heat (at the upper transition temperature) of about 1.1 calories/-gram °C is reasonable. The density of cuprous mercuric iodide is about 6 gms/cm$^3$, and the density of the silicone varnish is about 1 gm/cm$^3$; since relatively little varnish is necessary to hold the thermochromic material, a density of about 5 gms/cm$^3$ for the dry film is typical. The thermal conductivity of the film will usually be influenced by the vehicle, which has the lower thermal conductivity. Since the thermal conductivities of varnishes are relatively low, the value for the silicone varnish is reasonably assigned as the value of thermal conductivity for the entire film, e.g., $5 \times 10^{-6}$ calories/second centimeter °C. (Because the time periods are very short, the thermal characteristics of the substrate usually have no bearing on resolution in the film). Using the aforementioned equation and these exemplary values, this particular thermal constant is found to be $2.5 \times 10^{-3}$ sec, as follows:

$$\tau = l^2/ = l^2 c_p \rho / K$$
$$= (\tfrac{1}{2} \times 10^{-4})^2 (1.1)(5)/5 \times 10^{-6}$$
$$= 2.5 \times 10^{-3} \text{ sec}$$

If the exposure time is appreciably greater than the thermal time constant, e.g., more than 10 times the thermal time constant, then once can expect that diffusion of heat away from the spot where heat is actually being applied would produce deleterious effects similar to "blooming" in photographic materials.

Assuming that the maximum exposure time which can be permitted is the time period to limit diffusion to one-half micron, it must next be determined what power the beam must have in order to raise the temperature of the material by the desired amount. It has been experimentally determined that an exchanged energy density of about 100 millijoules/cm$^2$ is sufficient to change the reflectance from a value near one end of the hystersis loop to a value near the other end of the loop. (Calculation of the theoretical exchanged energy density—disregarding all losses—has given a value on the order of 15 millijoules/cm $^2$.) Next, dividing 100 millijoules/cm$^2$ by the time period of $2.5 \times 10^{-3}$ seconds, the power of the necessary beam is determined to be about 40 watts/cm$^2$. For the assumed beam diameter of 1 micron, the power required would be a modest 0.3 microwatts.

In situations where less precise resolution can be tolerated, the exposure time can be lengthened and the power requirement reduced in accordance with the aforementioned reciprocity law. For example, an exposure time of 30 seconds has been employed with the material described above, and the resolution was determined to be at least as good as 50 microns. On the other hand, a 10 watt carbon dioxide laser beam focused to a diffraction-limited spot will supply sufficient energy to raise the temperature of the thermochromic film illuminated thereby at least one-fourth degree centrigrade with exposure times in the nanosecond range. Faster heating may be accomplished with appropriate energy sources.

The exposure time and the energy absorbed from the beam have been emphasized herein as if these two parameters alone dictated the total diffusion which will be realized. This is essentially correct, although a thorough study of FIG. 2 will eveal that these two parameters are involved only in that portion of the cycle represented by the curve segment from point F to point G. Removal of the heating source at a time when the material has been heated to point G does not simultaneously terminate the diffusion of all heat away from the spot which the beam or beams actually struck; diffusion actually terminates only when the temperature of the locally heated spot has returned to the temperature of the remainder of the material, i.e., when the heated and non-heated portions have again reached thermal equilibrium. However, the diffusion of heat associated with cooling, e.g., from point G to point H in FIG. 2, is not nearly as great as that associated with heating. The diffusion of heat is lower because there is an anomaly in the specific heat curves for heating and cooling just as there is an anomaly in the two reflectance curves. The average of the specific heat values of cuprous mercuric iodide in cooling from point G to point H is only about one-tenth as large as the average value for the corresponding portion of the heating curve. Thus, whatever is still being diffused, as the material cools from point G to point H, is leaving a region of relatively low specific heat and entering a region of high specific heat. Accordingly, heating of the surrounding region by virtue of diffusion effectively terminates as soon as the heat source is removed.

The discovery of the extremely high resolution capability is most unexpected, since high resolution is not normally associated with thermally generated images. It is believed that the ultimate resolution which can be obtained is singularly a function of the grain size of the material, which fortuitously can be very small, e.g., at least as small as 1 micron. With the resolution capabilities demonstrated, thermochromic material may be used, inter alia, as the recording medium for high density data storage devices.

It is also known that thermochromic materials, and thus thermochromic films, exhibit a change in electrical conductivity coincident with change in reflectance. Cuprous mercuric iodide, for example, exhibits a change in conductivity of one to two orders of magnitude when passing through the reflectance transition range. The electrical conductivity also shows a hysteresis behavior.

Figures 3, 6:
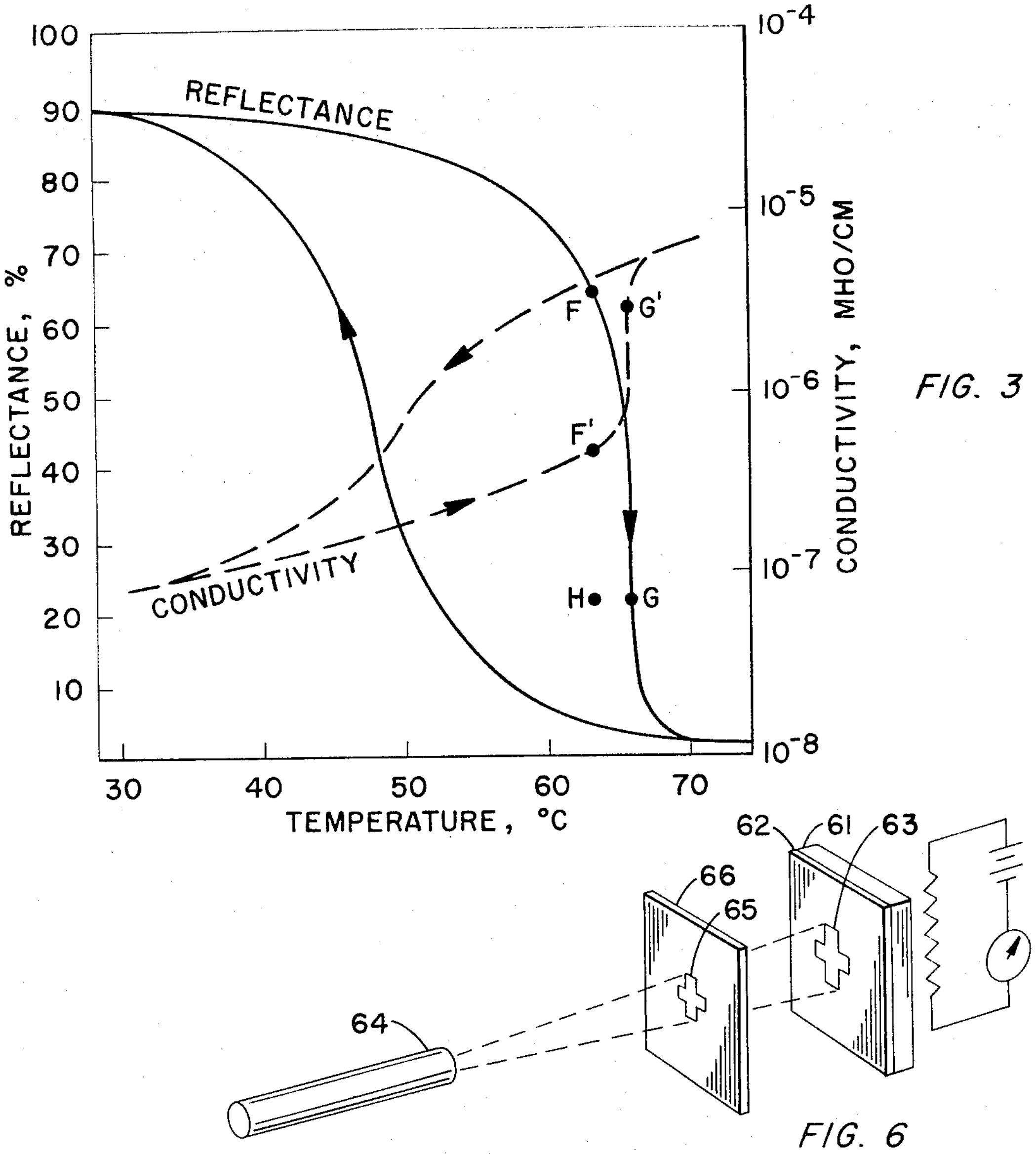
FIG. 3 is a plot of the conductivity versus temperature for cuprous mercuric iodide superimposed on a plot of reflectance versus temperature for the same material.
FIG. 6 is a schematic illustration of apparatus for selectively altering the reflectance of a thermochromic film.

FIG. 3 is a plot of conductivity versus temperature for cuprous mercuric iodide, superimposed on a plot of temperature versus reflectance for the same material. As shown in the figure, the conductivity of a film of cuprous mercuric iodide changes from about $5.5 \times 10^{-7}$ mhos/cm at 64°C to about $5.5 \times 10^{-6}$ mhos/cm at 68°C. This change in conductivity is coincident with a change of about 78 percent in reflectance of red light.

Figure 4:
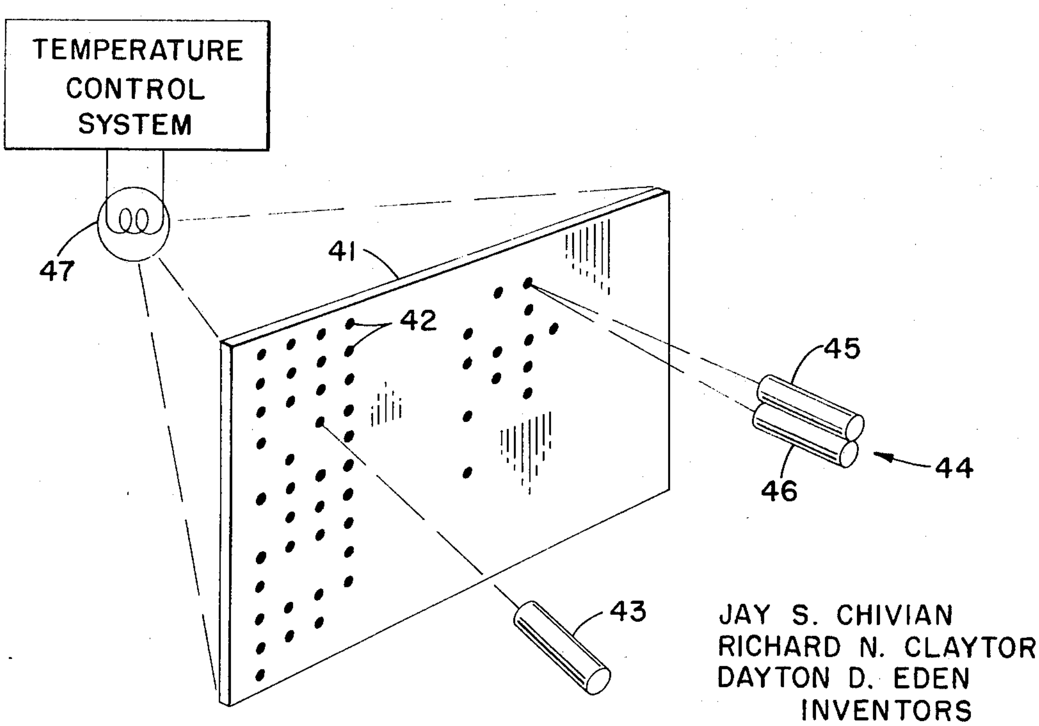
FIG. 4 is a pictorial illustration of one form of the invention for recording binary information in a thermochromic film in accordance with the invention.

Turning now to specific embodiments employing thermochromic materials, FIG. 4 pictorially illustrates a thermochromic film 41 with an array of spots 42 recorded thereon. Each spot 42 represents a binary information bit, and is recorded on a precise loction on film 41 with an energy pulse from energy source 43. For clarity in the drawing, the spots are shown as being separated by a relatively large distance. It should be appreciated, however, that more, efficient use can be made of the material if the spots are more closely spaced. In actual embodiments, spots will likely be almost touching one another.

To optimally record information on the film 41, the film is maintained at a holding temperature which is within the hystersis loop and just below the temperature at which a large change in a detectable characteristic of the material can be realized (e.g., Point F on FIG. 2). This is easily accomplished with conventional heaters such as lamp 47 which can both serve as a means for establishing a bias temperature in the film and serve as a means for erasing information in the film. Data is impressed on the film by activating an energy source 43, such as a laser or electron gun, and modulating the output thereof so as to illuminate discrete portions of the film 41 in accordance with information to be stored. Since the resolution capability of the thermochromic film is in the range of a micron or less, it is feasible to focus the energy beam from source 43 to a diameter in the micron range. Accordingly, extremely dense packing of information bits can be achieved. Each pulse of energy temporarily heats the spot 42 illuminated thereby to a second temperature, (e.g., Point G on FIG. 2) which is higher than the holding temperature but below the minimum black saturation temperature. As explained hereinabove, the spot 42 assumes a reflectance corresponding to the second temperature and maintains essentially the same reflectance as it cools (to point H) after the pulse is terminated. The reflectance condition of each discrete spot on the film, whether exposed to energy source 43 or not, represents a binary information bit.

The film 41 is moved relative to the focal point of energy source 43 at a desired rate. If it is desired to hold the film still and move the energy beam across the surface of the film, apparatus such as that disclosed in Application Ser. No. 817,612 filed Apr. 14, 1969 by D. D. Eden entitled "Light Beam Scanning Systems and Beam Shifting Devices for Use in Such Systems" would be suitable. Other scanning systems, both mechanical and optical, are well known to those skilled in the art. Thus, the binary data in the form of spots 42 and unaltered spaces can be readily recorded on the entire surface of the film. In view of the extremely high resolution capability of the thermochromic film, a spot storage capability of $10^6$ spots/$cm^2$ can readily be obtained, provided that increments of relative movement between the beam and the film on the order of 10 microns are obtained.

The information content of the film 41 can be readily retrieved by passing the film in close proximity to a read-out station 44. The read-out station may simply comprise a light source 45 and a light sensor 46. As each respective position of the film passes read-out station 44, the film is interrogated by illuminating the spot. The amount or color of the reflected light is determined by sensor 46. It is recognized that the unaided human eye cannot discern individual spots any smaller than 30 microns in size; but electrical sensors can be made as sensitive as seems desirable. Since spots as large as 30 microns are wasteful of recording space, it is preferred that the data spots on the thermochromic film be no greater than 30 microns. Spots having dimensions of less than 30 microns will be invisible to the human eye, but will be readily susceptible to examination by electro-optic means. Thus, binary data may be recorded in the film 41 by varying the reflectance of certain portions of the film in accordance with specific signals, and the information content of the film can be read with simple optical components. Since the read-out mechanism is extremely simple and small, an optical read-out head may be rapidly and easily positioned as desired in relation to a large memory disc; in theory, it should be able to locate specific memory bits much more readily than magnetic interrogation systems.

In an alternative embodiment, read-out may be accomplished electronically, utilizing another detectable characteristic of the material, i.e., its electrical conductivity. The device of FIG. 5 comprises a thermochromic film 51 disposed between two electrically conductive members 50 and 52. The structure is preferably a unitary one wherein conductive member 50 is a strip of Invar (a ferrous material which is particularly noted for dimensional stability with changing temperature) upon one surface of which is formed a thermochromic film 51, such as by painting, spraying, dipping, or other suitable coating methods. Conductive member 52 is preferably a transparent material such as tin oxide ($SnO_2$). Means 53 and 54 are provided to electrically connect conductive members 50 and 52 with a suitable voltage source 55.

Binary data bits may be encoded on the thermochromic film 51 in the form of discrete spots 56 and unaltered areas as described hereinabove with reference to FIG. 4. Since conductive member 52 is transparent, energy in almost any form may be transmitted directly to the surface of the thermochromic film 51 by any suitable pulsed source, such as an electron beam, laser, etc.

As noted above, electrical conductivity of the thermocrhomic film is substantially altered as the temperature of the film is raised through substantially the same temperature range associated with the reflectance hysteresis loop. The thermal history of the film is therefore recorded not only by a change in reflectance but also by changes in conductivity, specific heat, etc.

Referring again to FIG. 3, when a thermochromic film is maintained at a suitable holding temperature, e.g., that temperature represented by points F (on the reflectance curve) and F' (on the conductivity curve), the physical characteristics of any portion thereof may be altered to record a data bit in the film by selectively heating a portion to a higher temperature (e.g., the temperature corresponding to point G). The reflectance of the heated portion will have fallen dramatically to that shown by poing G. Concurrently, the conductivity of the heated portion of the film will have risen dramatically to that shown by the point G'. Even though the temperature of the entire film is immediately thereafter stabilized at the temperature associated with points F and F', the reflectance and conductivity of the heated portion of the film essentially remain at the values corresponding to points G and G'. Under these conditions, the thermal history of the film may be electronically interrogated by scanning the film with a low energy electron beam 57 while maintaining a potential across the thermochromic film 51 by means of conductive members 50 and 52. The interrogation scanning beam preferably is of lower energy than the writing beam to avoid recording the interrogation scan into the film. As the interrogation beam 57 passes over a localized area of film where a recording beam has previously altered the characteristics of the film (e.g., spot 56), the higher conductivity will allow increased current to flow between members 50 and 52. By electronically recording the position of the scanning beam with reference to such increases in current passing between plates 52 and 50, the location of previously recorded data bits can be electronically determined. Apparatus for electronically recording the position of such scanning beams is conventional and hence will not be discussed in detail herein.

Because of the increased electrical conductivity of those portions which have been heated by the beam of radiant energy, enhancemenet of contrast between a spot and its background can be achieved by Joule heating. Thus, after a dark spot has been established on material having an overall red appearance, impressing a suitable voltage across the material will cause appreciable current to flow through the high-conductivity, dark spot, tending to make it even darker; relatively little current will flow through the red (and lower conductivity) background material. This effect is conveniently referred to as an enhancement technique. By impressing a larger voltage across the same material, the localized Joule heating at the spots can be made so severe as to cause a permanent change (e.g., oxidation) in the spots. This technique can be used to advantage when it is desired to have an inalterable record of a particular logic operation.

Figure 5:
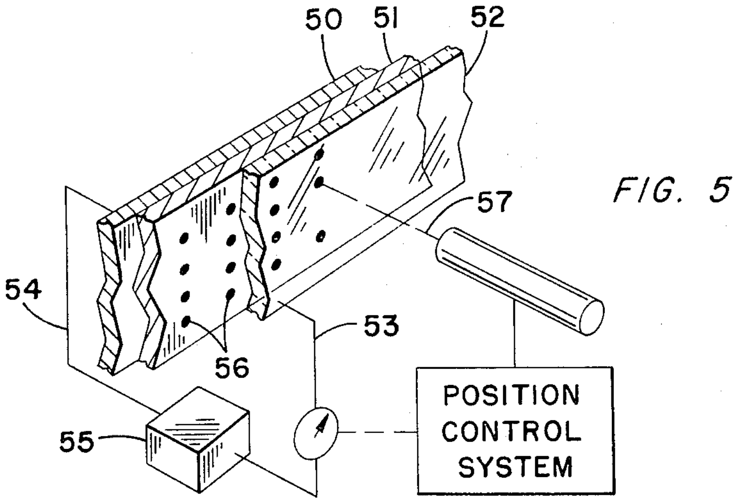
FIG. 5 is a pictorial illustration of apparatus for electronically in-terrogating a thermochromic recording medium.

While the film shown in FIG. 5 has been described as preferably unitary, it will be understood that film 51 may be made self-supporting and movable between fixed plates such as conductive members 50 and 52. Likewise, film 51 may be affixed to either of the conductive members and adapted for movement relative to the other.

As described hereinabove, information recorded in the thermochromic film can be erased by heating the film to a temperature above its high temperature saturation point (a temperature above the hystersis envelope). This erasing procedure of course, may be applied to the entire film or, with suitable controls, to any portion thereof.

It has also been discovered that the reflectance of portions of a thermochromic film can be altered by another method which, although not fully understood, can be conveniently and easily performed and is referred to hereinafter as "reflectivity inversion." The reflectivity inversion is, in effect, the changing of the material from a high temperature reflectance condition to a lower temperature reflectance condition by adding still more energy to the material. Such a change cannot be explained with reference to hysteresis curves alone.

It has been discovered that the changed reflectance of a spot of thermochromic material which has been temporarily heated, such as spot 42 in FIG. 4, can be inverted so as to exhibit the same reflectance as the unaltered material surrounding spot 42 without using the usual erasing processes, that is, cycling the material through the ends of the hysteresis envelope. This surprising reflectivity inversion is accomplished by again heating spot 42, although with somewhat less energy than that required to record spot 42. That is, the energy required to invert the reflectance of the material is less per unit area of exposed film than the energy per unit area required to record the spot in the film.

The following example illustrates how this phenomenon is observed. The surface of a copper plate 61 was coated with a paint of thermochromic material 62 as shown in FIG. 6. Thermochromic film 62 was a paint comprising 2.7 parts cuprous mercuric iodide to one part silicone varnish, by weight. The dried layer 62 was approximately 0.001 inch thick. Copper plate 61 was maintained at a temperature of 65.5 C with suitable resistors and an image 63 recorded thereon by passing the beam from a $CO_2$ laser 64 through aperture 65 in a mask 66.

Carbon dioxide laser 64 was operated at a total beam power of about 10 watts. The beam was slightly divergent, but an adequate power density, i.e., at least 150 $mW/cm^2$, existed at the surface of the thermochromic film to cause the film to change from a low-temperature reflectance to a high-temperature reflectance. The diameter of the beam at the aperture 65 was at least large enough to fill the aperture. It should be understood that a portion of the beam from laser source 64 may be considered to pass directly through aperture 65 undeflected, and a portion of the beam may be considered to be diffracted from the edges of the aperture. In language familiar to those versed in holography, the undeflected portion of the original beam may be called the reference beam, and the diffracted portion of the original beam may be termed the object beam. The superposition of the object and reference beams at the film 62 gives rise to an interference pattern which is recorded in the film 62. Under the above conditions, a well defined black-on-red interference fringe pattern was formed in the thermochromic film 62 after exposure for about 30 seconds.

Mask 66 was then removed; the temperature of substrate 61 was 65.7°C. With the mask 66 absent, the film 62 (including the fringe pattern 63) was then illuminated with the same laser source 64 for a total exposure time of about 30 seconds. After termination of illumination, the entire illuminated area was seen to be in the black or high temperature state. However, almost immediately after termination of illumination, the initially black fringe pattern reappeared as a red pattern against the relatively black background of those film portions immediately surrounding the original pattern. Thus, the film portions which were still red after the first illumination were darkened by the second illumination, while the portions darkened by the first illumination were inverted to a red appearance by the second illumination. Emphasis should perhaps be given to the fact that the reflectance of the black portions of the fringe pattern 63 was inverted to its original red color without employing the usual "erasing" processes. Changing red portions of the fringe pattern 63 to black is more straightforward, and could have been easily predicted by merely examining the hysteresis envelope.

While the same energy source was utilized for recording fringe pattern 63 and for inversion thereof, it will be recognized that the inversion of the material corresponding with fringe pattern 63 was accomplished with less energy per unit area of film than that used to record fringe pattern 63, since the dark portion of the fringe pattern is the product of constructive interference between radiation passing unobstructed through the aperture 65 and that diffracted from the edges of aperture 65. Thus, the laser energy used to record 63 is greater than the energy per unit area of exposed film when the same laser source is used to illuminate the film 62 without being obstructed by mask 66.

It is believed that the anomalous behavior referred to herein as reflectivity inversion can be explained as a relatively simple order-disorder characteristic of the material. Referring for example to FIG. 3, it will be observed that the reflectance of the thermochromic material begins to change as the material is heated along temperature-increasing curve 1. If the film is maintained at the temperature corresponding to point F and a sufficient amount of energy is applied to one spot of the material so as to raise the temperature of the spot to point G, the reflectance of that spot will remain essentially the same as that of point G after the spot is allowed to cool to the temperature of the bulk of the film, all as explained hereinabove.

A relatively simple model may explain this phenomenon. If the material is considered to be 100 percent in the $\beta$ state at temperatures below the transition temperature and 100 percent in the $\alpha$ state above the transition temperature, the material may be considered partially $\beta$ and partially $\alpha$ at temperatures within the transition range, with the percentage of $\alpha$ form increasing with temperature. It will be seen that as the material is heated from point C to point G (FIG. 3) the material is transformed from $\beta$ to $\alpha$. At point G the material may be approximately 10 percent $\beta$ and 90 percent $\alpha$. On cooling back to point H the ratio of $\beta$ to $\alpha$ form remains substantially unchanged, since at temperature equivalent to point H insufficient energy is available to convert the material from $\alpha$ to $\beta$. Thus, the situation may be considered analogous to the metastable coexistence of two states in an alloy which is heated and then quenched. Upon reheating the same spot of material with somewhat less energy than that required to produce the amount of $\alpha$ material, the $\alpha$ state is partially converted to $\beta$ form. This phenomena in thermochromic materials may be considered to be somewhat analogous to annealing alloys to eliminate higher disorder states.

While the above-described model satisfactorily describes the phenomena observed in certain thermochromic materials, it is presented merely as a theoretical explanation and is not to be construed as limiting the scope of the invention.

Utilizing the principles discussed above, thermochromic films may be used as a recording and switching medium for performing logic functions. For example, a position on thermochromic film 41 (FIG. 4) corresponding to spot 42 may be used to record a data bit by illumination as discussed above. Upon reheating with a lower energy source, the spot 42 is inverted or erased. Each spot location on film 41 may then be considered a bistable medium which may contain binary information in the form of alternate states. Thus, the film may be used to perform binary logic functions by selectively switching the diffuse reflectivity or conductivity of spots on the film.

The state or condition of each spot location may be determined by optical interrogation, as discussed with reference to FIG. 4, or by electronic interrogation as discussed with reference to FIG. 5.

From the foregoing, it will be observed that various apparatus may be constructed utilizing the principles disclosed to record data in binary form on the thermochromic materials and to utilize such devices for logic functions. It is to be understood that although the invention has been described with particular reference to specific embodiments thereof, the forms of the invention shown and described in detail are to be taken as preferred embodimets of same, and that various changes and modifications may be resorted to without departing from the spirit and scope of the invention.

What is claimed is:

1. The method of recording data in binary form on a thermochromic film, said film being characterized by exhibiting hysteresis in its electrical conductivity with change of temperature over a certain range of temperatures, comprising the steps of:

a. establishing a bias temperature in a thermochromic film, said bias temperature being within the range of temperatures en-compassed by the hysteresis loop of said thermochromic material;

b. encoding binary data on a beam of radiant energy;

c. focusing said radiant beam to a diameter on the order of 10 microns or less and directing same onto discrete portions of said thermochromic film for a controlled period of time, thereby to temporarily raise the temperature of said discrete portions to a second temperature which is greater than said bias temperature but less than the minimum saturation temperature associated with the high temperature reflectance of said thermochromic film, with said controlled period of time being not more than 10 times the recording medium's thermal time constant; and d. passing current through said thermochromic film subsequent to the focusing step, thereby to cause Joule heating of said discrete portions upon which bits of binary data have been recorded.

2. The method set forth in claim 1 wherein said discrete portions are heated by Joule heating to a third temperature which is greater than said second temperature but less than the minimum saturation temperature associated with the high temperature reflectance of said thermochromic film.

3. The method set forth in claim 1 wherein said discrete portions are heated to a third temperature which is substantially greater than the minimum saturation temperature associated with the high temperature reflectance of said thermochromic film, thereby to cause permanent change in the reflectance of said discrete portions.

4. In an apparatus for recording high resolution binary data at selected spots on an erasable, re-usable recording medium, which apparatus includes means for producing radiation signals in binary form, said means including a source of radiation and means for focusing the radiation to a beam having a diameter appreciably less than 30 microns, said apparatus further including an erasable, reusable recording medium which incorporates a thermochromic material having a detectable characteristic which exhibits hysteresis with change in temperature over a certain range, said thermochromic material having a hysteresis loop bounded on its high end by a minimum saturation temperature associated with its high temperature characteristic and on its low end by a maximum saturation temperature associated with its low temperature characteristic, and said recording medium having a thermal time constant defined as the ratio of the square of a given thermal diffusion length occasioned by absorbed energy passing laterally through the material and the material's thermal diffusivity, said recording medium being characterized by recording the incidence of radiation signals without vaporizing as a result of such incidence, and said recording medium having a surface with a multiplicity of discrete portions with each having a unique address, the method of:

a. establishing a bias temperature in said thermochromic material between said minimum saturation temperature and said maximum saturation temperature; and b. directing said radiation signals onto selected ones of the discrete portions of the surface of said thermochromic material in order to directly heat said portions, said discrete portions having a size which is the same as the beam diameter, thereby to temporarily raise the temperature of somewhat larger portions of said thermochromic material to a recording temperature which is greater than said bias temperature, said larger portions encompassing the directly heated portions, and said radiation signals being directed onto said material within a controlled period of time that is sufficiently short so that diffusion of heat is limited to the extent that said larger portions of heated material have a maximum dimension of 30 microns, with the controlled period of time being not appreciably greater than the recording medium's thermal time constant, and the diffusion of heat being limited so that heat from a surface portion at one address does not diffuse into a surface portion at an adjacent address, whereby the subsequent interrogation of said recording medium will not provide an erroneous answer because of uncontrolled heat diffusion through the material.

5. The method defined in claim 4 wherein said thermochromic material is disposed between electrically conductive members during the time that said radiation signals may be directed onto discrete portions, and including the step of passing current simultaneously between said conductive members and through said thermochromic material, whereby the contrast between the discrete portions and the rest of the material is enhanced.

6. In an apparatus having an erasable recording means including a thermochromic film which exhibits hysteresis in changing from a first reflectance to a second reflectance with changing temperature over a certain range, said thermochromic film having a hysteresis loop bounded on its high end by a minimum saturation temperature associated with its high temperature reflectance and on its low end by a maximum saturation temperature associated with its low temperature reflectance, and said thermochromic film having a multiplicity of addressed portions at which information bits are to be recorded, the method comprising the steps of:

a. establishing a bias temperature in said thermochromic film between said minimum and maximum saturation temperature, thereby to cause said film to exhibit a first reflectance, with the bias temperature being selected near the middle of the hysteresis loop so as to promote an appreciable change in the film's reflectance with only a small change in temperature;

b. producing radiant energy in pulses corresponding to binary information bits which are to be recorded;

c. directing a first pulse of radiant energy of a given magnitude onto a selected discrete portion of said thermochromic film, thereby to temporarily raise the temperature of said discrete portion to a second temperature which is greater than said bias temperature so as to change the reflectance of said discrete portion to a second reflectance;

d. re-establishing thermal equilibrium in the thermochromic film after termination of each pulse; and e. directing another pulse of radiant energy of a second magnitude onto selected ones of said discrete portions, with the magnitude of the second pulse being greater than that of the first pulse, said second pulse of radiant energy being sufficient to raise the temperature of said discrete portion to a third temperature which is greater than said bias temperature, thereby to invert the reflectance of the discrete portion from said second reflectance back to said first reflectance.

7. The method defined in claim 4 wherein said thermochromic material consists essentially of material selected from the group consisting of:

a. material having the general formula $M_2M'X_4$ where M is $Ag^{1+}$, $Cu^{1+}$, or $Tl^{1+}$, M' is $Hg^{2+}$ or $Cd^{2+}$, and X is a halide;

b. material having the general formula $MM'_2X_4$ where M is zinc, cadmium or mercury, M' is aluminum, gallium or indium, and X is sulphur, selenium or tellurium; and c. the vanadium oxides.

8. Apparatus for recording high resolution binary data on an erasable, re-usable recording medium, comprising:

a. means for producing radiation signals in binary form, said means including a source of radiation and means for focusing the radiation to a beam having a diameter appreciably less than 30 microns;

b. an erasable, re-usable recording medium including a thermochromic material having at least one detectable characteristic including reflectance which exhibits hysteresis with change in temperature over a certain range, said thermochromic material having a hysteresis loop bounded by a minimum saturation temperature associated with its high temperature characteristic and a maximum saturation temperature associated with its low temperature characteristic, and said thermochromic material being disposed between electrically conductive members, and including means for passing current simultaneously between said conductive members and through said thermochromic material;

c. means for establishing a bias temperature in said thermochromic material between said minimum saturation temperature and said maximum saturation temperature, whereby the material can be made particularly sensitive to incident radiation;

d. means for directing said radiation signals onto discrete portions of the surface of said thermochromic material in order to directly heat said portions, said discrete portions having a size which is the same as the beam size, thereby to temporarily raise the temperature of somewhat larger portions of said thermochromic material to a recording temperature which is greater than said bias temperature, said larger portions encompassing the directly heated portions and resulting from the diffusion of heat from the directly heated portions, said means being adapted to direct said radiation signals onto said material within a controlled period of time that is sufficiently short so that thermal diffusion is limited to the extent that said larger portions of heated material have a maximum dimension of 30 microns;

e. means for scanning said thermochromic material with an electron beam which imparts substantially less energy per unit area to said thermochromic material than said radiation signals; and f. means for detecting the current passing through the thermochromic material when said material is scanned by the scanning beam.

* * * * *